(12) United States Patent
Isami

(10) Patent No.: US 7,144,439 B2
(45) Date of Patent: Dec. 5, 2006

(54) FERTILIZER CONTAINING YAEYAMA AOKI EXTRACT

(75) Inventor: Fumiyuki Isami, Tokyo (JP)

(73) Assignee: Morinda, Inc., Provo, UT (US)

( * ) Notice: Subject to any disclaimer, the term of this patent is extended or adjusted under 35 U.S.C. 154(b) by 103 days.

(21) Appl. No.: 10/614,466

(22) Filed: Jul. 7, 2003

(65) Prior Publication Data

US 2004/0244447 A1 Dec. 9, 2004

(51) Int. Cl.
*C05F 11/00* (2006.01)

(52) U.S. Cl. .............................. 71/64.1; 71/23; 71/25

(58) Field of Classification Search .................. 71/23, 71/25, 64.1
See application file for complete search history.

(56) References Cited

U.S. PATENT DOCUMENTS

| | | | | |
|---|---|---|---|---|
| 3,770,198 | A * | 11/1973 | Mihara | 239/10 |
| 3,821,963 | A * | 7/1974 | Olson et al. | 137/99 |
| 4,459,149 | A * | 7/1984 | Moran et al. | 71/24 |
| 5,648,264 | A * | 7/1997 | Kume | 435/264 |
| 6,254,913 | B1 * | 7/2001 | Wadsworth et al. | 426/481 |
| 6,403,086 | B1 * | 6/2002 | Yegorova | 424/94.2 |
| 6,405,948 | B1 * | 6/2002 | Hahn et al. | 241/1 |
| 2003/0161901 | A1 * | 8/2003 | West et al. | 424/765 |

FOREIGN PATENT DOCUMENTS

HU 43310 * 10/1987

OTHER PUBLICATIONS

"Betterman" by Interceuticals, downloaded from www.naturalhealthconsultant.com/Monographs/Betterman.html (Mar. 1998).*
"NONI", downloaded from http://web.archive.org/web/20020207214423/http://www.nukahivatrading.com/noni.htm, Feb. 7, 2002.*
A Pure Hawaiian Noni Juice, downloaded from http://web.archive.org/web/20030523122956/http://www.nonialoha.com, May 23, 2003.*
"NONI in the news" downloaded from http://www.incc.org/news_june.htm, Jun. 202.*
"Morinda", downloaded from http://www.drugdigest.org/DD/DVH/HerbsTake/0,3927,552025/Morinda.00.html, Jun. 2003.*
Publication from www.nonialoha.com, May 2003.*
Publication from http://www.drugdigest.org/DD/DVH/HerbsTake/0,3927,552025/Morinda,00.html, Jun. 30, 2003.*
Dougherty, Field_guide to On-Farm Composting, Apr. 1999, pp. 1-3, 26-29.*

* cited by examiner

*Primary Examiner*—Chhaya Sayala
(74) *Attorney, Agent, or Firm*—Kirton & McConkie; Michael F. Krieger

(57) ABSTRACT

An eco-friendly fertilizer that acts as a plant growth promotion agent, soil improvement agent, bactericide and insecticide agent, disease and harmful insect prevention agent and the like, and is suitable for organic farming. The fertilizer contains extract from fruits, leaves, stems, seeds and/or roots of the Yaeyama Aoki and increases the amount of yield and extends the freshness period after harvest when applied to fruits, vegetables, leafy vegetables, root vegetables, grains as well as flowers and shrubs.

4 Claims, No Drawings

FERTILIZER CONTAINING YAEYAMA AOKI EXTRACT

BACKGROUND OF THE INVENTION

1. Related Applications

This application claims priority to Japanese Application Serial No. JP 2003-159012 filed Jun. 4, 2003, entitled AGRICULTURAL ADDITIVES COMPRISING MORINDA CITRIFOLIA EXTRACTS.

2. Field of the Invention

The present invention relates to a fertilizer that increases the crop yield and maintains the freshness of the crop after harvest.

3. Background and Related Art

The Indian mulberry plant (mulberry) known as Yaeyama Aoki (scientific name: Morinda citrifolia) is a small to midsize tree, namely a shrub of height 3–10 meters. This shrub grows in tropical coastal regions in the world. The plant grows wildly, but also may be cultivated on a plantation or small individual farm. Yaeyama Aoki possesses slightly round stems and leaves with evergreen, dicotomic (or quasi alternating), dark, shiny, wavy protruding leaf veins. Leaves are wide, elongated, and circular or rectangular shaped with pointed edges, having lengths of 10–30 cm and widths of 5–15 cm.

Fruit of the Yaeyama Aoki comprises many small, round, rough, waxy, egg-shaped or elliptic, semitransparent subsections that are 5–10 cm in length and 5–7 cm in thickness and are white, light green or yellow in color. Moreover, the fruit has "eyes" on the skin similar to those of potatoes. The fruit is rich in water, bitter with dark yellow or yellow white color containing numerous red-brownish two cellular nuclei with elongated circular or triangular wings, each nucleus having about four seeds.

When heated sufficiently, the fruit releases a strong odor similar to that of fermented cheese. Some natives eat the fruit as food, but the most common use of the Yaeyama Aoki has been for red and yellow dye material. In recent years, Yaeyama Aoki has drawn much interest for its nutrition and health benefits.

Juice from the Yaeyama Aoki is known to have strong anti-oxidation, anti-bacterial and anti-virus effects. Moreover, the fruit of Yaeyama Aoki is known to contain various nutritious elements such as amino acids, minerals, vitamins and polysaccharides. Herbs, health foods, pet foods, cosmetics and other products have been developed utilizing rich nutritious elements of the fruit. However, a fertilizer utilizing fruits, leaves, seeds and the like of Yaeyama Aoki is not yet known.

SUMMARY OF THE INVENTION

The present invention aims to provide fertilizers that are desirable for the ecological system and are suitable for organic farming. It is desirable that the fertilizer function as fertilizer, growth promotion agent of crops, soil improvement agent, anti-bacteria and insecticide agent, disease and harmful insect prevention agent, and the like. Moreover, the fertilizer is a natural material having such effects as promotion of crop growth, improvement in crop quality, improvement in resistance against disease and harmful insects, increase in the amount of crop yield, enhancement in sugar and taste, improvement in freshness after harvest and the like.

The present invention provides a fertilizer comprising extracts from the fruit, leaves, stem, seed and/or root of Yaeyama Aoki. Preferably, in the fertilizer of the present invention, extract from fruit, leaves, stem, seed and/or root of Yaeyama Aoki are diluted by a factor of 1–10,000 times (in weight) with water. The fertilizer of the present invention increases the amount of crop yield and maintains the freshness of the crop after harvesting.

The fertilizer of the present invention is produced by extracting effective components from fruit, leaves, stem, seeds and/or root of Yaeyama Aoki.

In producing Yaeyama Aoki fruit juice, the fruit is hand or machine picked and is washed sufficiently. The fruit is then further ripened for several days after harvest. Ripened fruit is kept under low temperature for several days to several weeks before processing. Next, the fruit is peeled and seeds are removed by hand or by using a mechanical separator to obtain fruit juice and pulp. The fruit juice is then obtained by crushing, squeezing and filtering the fruit and pulp. If necessary, the fruit juice is pasteurized before it is concentrated, or dried. Finally, the fruit juice is kept under cooling or freezing conditions. An alternative to producing Yaeyama Aoki fruit juice is to purchase already prepared juice at retail stores.

In order to obtain extract from leaves, stem, seeds and/or roots of Yaeyama Aoki, first these raw materials are chopped. Next, either a hot water extraction method wherein water, five to ten times in amount, is added and heated at the temperature of 95° C. or an extraction method wherein organic solvent such as ethanol, methanol, hexane and the like or mixture of water and organic solvent are used is applied. Moreover, wet pressure and heat process using ordinary autoclave equipment is applied. Furthermore, treatment processes using cellulose hydrolysis enzyme is be added to aforementioned processes. After removing insoluble components through filtering, extract obtained from leaves, stems, seeds and/or roots, organic solvent is removed and extract of the present invention is obtained. This extract is pasteurized, if necessary, concentrated or dried. Drying is achieved using ordinary spray drying or freeze drying. The extract is stored under cooling or freezing conditions.

Moreover, oil is extracted from seeds. Oil is obtained by drying, crushing, and squeezing seeds with a press. More oil is extracted from seed cake residue by adding hexane solution and the like. The oil contains fatty acids such as linoleic acid, oleic acid, palmitic acid and stearic acid in the form of triglycerides.

The fertilizer of the present invention is produced by forming extract or a mixture of extract from fruit, stem, seed and/or root of Yaeyama Aoki obtained using the aforementioned procedures and is made into a liquid, granule, powder or paste agent with appropriate carrier materials. The fertilizer of the present invention is used by dissolving or dispersing the fertilizer in water. Moreover, the fertilizer of the present invention is mixed with a fertilizer component such as ammonium sulfate, urea, potassium, nitrogen and ammonium chloride, as well as compost, chicken manure, cow manure, saw dust, rice bran, garlic oil, fish oil, vermiculite, montmorillonite, active carbon, charcoal, diatomite and/or talc.

The fertilizer of the present invention is applied to fruits, vegetables, leafy vegetables, root vegetables, grains, flowers and bulbs. In fact, the following usage is suggested: spray or irrigate the fertilizer in the soil prior to planting or during plant growth; coat plants with the fertilizer during cutting, dividing or re-planting; coat seeds or bulbs with the fertilizer during planting; coat wilting flowers and shrubs with the fertilizer; disperse the fertilizer onto water grown plants;

coat plants infected with bacteria or a virus with the fertilizer; coat cut flowers and crops after harvest with the fertilizer.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

DETAILED DESCRIPTION OF THE INVENTION

The present invention will be described further using the embodiment below. However, the embodiment will, by no means, limit the scope of the present invention.

In this embodiment, Yaeyama Aoki juice (Tahitian Noni® Juice made by Morinda International Inc.) sold through retail stores was used as Yaeyama Aoki extract. An experiment was conducted in a strawberry green house on six furrows where each furrow had 80 Tochiotome strawberry plants and was 30 meters long. Each furrow was divided into two equal sections, a Yaeyama Aoki juice section and a control group section. In the Yaeyama Aoki juice section, diluted Yaeyama Aoki juice was dispersed. On the control group section, an equal amount of water was dispersed.

Yaeyama Aoki juice was diluted with water and each time, three liters of the solution per one square meter was dispersed on the strawberry plants. Dispersion began 12 days prior to the formation of strawberry fruits, once every two days for a total of five dispersions. In the first three dispersions, the Yaeyama Aoki juice was diluted by a factor of 200 times its weight with water, and for the last two dispersions it was diluted by a factor of 300 times its weight in water. After harvesting the strawberries, the amount of yield, sugar content and freshness maintenance were examined for both the control group and the Yaeyama Aoki juice group.

Only the strawberries measuring longer than 3.0 cm from the calyx to the tip of the fruit were included to determine, using a scale, the amount of harvest in weight. The yield was 600 grams (38 strawberries) for the control group, while that for the group on which Yaeyama Aoki juice was dispersed was 1400 grams (96 strawberries). From the comparison, it was concluded that the coating and dispersion of Yaeyama Aoki juice sped up the growth of the strawberries, reaching the harvest criteria of 3.0 cm faster. Moreover, during the experiment white flour disease was seen on some plants, but the dispersion of Yaeyama Aoki prevented the spread of the disease.

Sugar content was measured with a digital sugar meter (measurement accuracy of ±0.2 BRIX) made by Kyoto Denshi Kogyo kk. After removing the calyxes, 10 strawberries were placed in a blender and thoroughly agitated. The resulting strawberry juice was poured into the sugar meter and measured. The mean value of the sugar content for the group with Yaeyama Aoki dispersion was 8.0 Brix while that of the control group was 7.1 Brix. The experiment showed a 13% increase in the sugar content with the dispersion of Yaeyama Aoki juice.

Next, in order to examine the maintenance of freshness after harvest, strawberries harvested were kept and observed for ten days in a refrigerator. Some of the fruits in the control group were found to be rotten with white mold at 10 days after harvest, while no mold was found and the surface was tight for the strawberries from the Yaeyama Aoki group. From this, it was concluded that the dispersion of Yaeyama Aoki juice oil the plant extends freshness period of the strawberry and prevents mold growth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A fertilizer composition comprising:

Yaeyama Aoki juice;

processed Yaeyama Aoki leaves; and processed Yaeyama Aoki seeds, wherein the Yaeyama Aoki composition is diluted by a factor of about 200–300 times in weight with water.

2. The fertilizer of claim 1 further comprising an ingredient selected from a list consisting of: an appropriate carrier material, ammonium sulfate, urea, potassium, nitrogen, ammonium chloride, compost, chicken manure, cow manure, saw dust, rice bran, garlic oil, fish oil, vermiculite, montmorillonite, active carbon, charcoal, diatomite and talc.

3. The fertilizer of claim 1 further comprising:

processed Yaeyama Aoki stems.

4. The fertilizer of claim 1 further comprising:

processed Yaeyama Aoki roots.

* * * * *